(12) United States Patent
Liu (10) Patent No.: US 11,841,749 B2
(45) Date of Patent: Dec. 12, 2023

(54) ELECTRONIC DEVICE AND ASSEMBLY METHOD THEREOF

(71) Applicant: GUANGDONG OPPO MOBILE TELECOMMUNICATIONS CORP., LTD., Guangdong (CN)

(72) Inventor: Min Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 420 days.

(21) Appl. No.: 17/325,136

(22) Filed: May 19, 2021

(65) Prior Publication Data

US 2021/0271296 A1   Sep. 2, 2021

Related U.S. Application Data

(63) Continuation of application No. PCT/CN2019/109521, filed on Sep. 30, 2019.

(30) Foreign Application Priority Data

Nov. 21, 2018 (CN) .......................... 201811393816.X (51) Int. Cl.
*G06F 1/16* (2006.01)
*G02B 5/30* (2006.01)

(52) U.S. Cl.
CPC ......... *G06F 1/1686* (2013.01); *G02B 5/3025* (2013.01); *G06F 1/1656* (2013.01)

(58) Field of Classification Search
CPC ... G02B 5/3025; G06F 1/1686; G06F 1/1656; G06F 1/1637; H04M 1/0266; H04M 1/0264; G02F 1/13312; G09F 9/00
See application file for complete search history.

(56) References Cited

U.S. PATENT DOCUMENTS 8,155,514 B1 *  4/2012  Chow ................. H04M 1/0264
                                                                      396/176
10,520,764 B2 * 12/2019  Yang .................... G06F 1/1637
(Continued)

FOREIGN PATENT DOCUMENTS

CN       203179411 U    9/2013
CN       105301848 A    2/2016
(Continued)

OTHER PUBLICATIONS

Communication pursuant to Article 94(3) EPC for EP Application 19887862.1 dated Apr. 6, 2023. (5 pages).
(Continued)

*Primary Examiner* — Lisa Lea-Edmonds
(74) *Attorney, Agent, or Firm* — Young Basile Hanlon & MacFarlane, P.C (57) ABSTRACT

An electronic device includes a display module and a backlight module. The display module is provided with a first mounting hole. A first light-shielding adhesive portion is formed in the first mounting hole. A second mounting hole is formed on the backlight module. The backlight module is attached to the display module, so that the first mounting hole is communicated with the second mounting hole to form a mounting space. A second light-shielding adhesive portion connecting the first light-shielding adhesive portion to the backlight module is formed in the second mounting hole.

20 Claims, 4 Drawing Sheets

(56) References Cited

U.S. PATENT DOCUMENTS

| | | | | |
|---|---|---|---|---|
| 10,620,665 | B2* | 4/2020 | Cheng | H04M 1/0264 |
| 10,728,641 | B2* | 7/2020 | Lee | H04R 17/00 |
| 10,895,773 | B1* | 1/2021 | Zhang | G02F 1/133512 |
| 10,917,506 | B2* | 2/2021 | Cheng | H04M 1/0266 |
| 11,194,195 | B2* | 12/2021 | Tang | G02F 1/133512 |
| 11,196,849 | B2* | 12/2021 | Tang | G06F 1/1626 |
| 11,366,348 | B2* | 6/2022 | Son | G02F 1/133331 |
| 11,556,024 | B2* | 1/2023 | Tang | G02F 1/1368 |
| 2008/0129916 | A1 | 6/2008 | Ota et al. | |
| 2012/0147622 | A1 | 6/2012 | Tsai et al. | |
| 2012/0148225 | A1* | 6/2012 | Chow | H04M 1/0264 |
| | | | | 396/176 |
| 2013/0342748 | A1 | 12/2013 | Ma et al. | |
| 2017/0330517 | A1 | 11/2017 | Gu et al. | |
| 2019/0208300 | A1* | 7/2019 | Lee | H04R 7/045 |
| 2019/0243417 | A1* | 8/2019 | Cheng | G06F 1/1686 |
| 2020/0174307 | A1* | 6/2020 | Chang | G02F 1/133308 |
| 2021/0072588 | A1* | 3/2021 | Tang | G02F 1/133308 |
| 2021/0109398 | A1* | 4/2021 | Son | G06F 1/1643 |
| 2021/0223464 | A1* | 7/2021 | Zhang | G02B 6/0073 |
| 2023/0059833 | A1* | 2/2023 | Son | G06F 1/1656 |

FOREIGN PATENT DOCUMENTS

| | | |
|---|---|---|
| CN | 105700389 A | 6/2016 |
| CN | 106994429 A | 8/2017 |
| CN | 107087089 A | 8/2017 |
| CN | 107632448 A | 1/2018 |
| CN | 107966845 A | 4/2018 |
| CN | 108153023 A | 6/2018 |
| CN | 108169946 A | 6/2018 |
| CN | 108196625 A | 6/2018 |
| CN | 108200247 A | 6/2018 |
| CN | 108254976 A | 7/2018 |
| CN | 108257505 A | 7/2018 |
| CN | 108259651 A | 7/2018 |
| CN | 108301848 A | 7/2018 |
| CN | 108344377 A | 7/2018 |
| CN | 207835529 U | 9/2018 |
| CN | 108628043 A | 10/2018 |
| CN | 108681131 A | 10/2018 |
| CN | 108769313 A | 11/2018 |
| CN | 108803144 A | 11/2018 |
| CN | 108828823 A | 11/2018 |
| CN | 108845450 A | 11/2018 |
| CN | 109272868 A | 1/2019 |
| CN | 110648586 B | 4/2022 |
| JP | 4939893 B2 | 5/2012 |
| KR | 20120093009 A | 8/2012 |
| TW | M497292 U | 3/2015 |
| WO | 2018120582 A1 | 7/2018 |
| WO | 2018196149 A1 | 11/2018 |

OTHER PUBLICATIONS

Chinese Third Office Action with English Translation for CN Application 201910871075.X dated Oct. 9, 2021. (12 pages).
Extended European Search Report for EP Application 19887862.1 dated Nov. 24, 2021. (74 pages).
International Search Report for International Application PCT/CN2019/109521 dated Jan. 3, 2020. (12 pages).
China First Office Action with English Translation for CN Application 201811393816.X dated Nov. 18, 2019. (17 pages).
Notification to Grant Patent Right for Invention with English Translation for CN Application 201811393816.X dated Sep. 30, 2020. (6 pages).
Chinese Office Action with English Translation for CN Application 201910871075.X dated Jan. 6, 2022. (8 pages).
Chinese Second Office Action with English Translation for CN Application 201910871075.X dated Jul. 15, 2021. (15 pages).

* cited by examiner

ELECTRONIC DEVICE AND ASSEMBLY METHOD THEREOF

CROSS-REFERENCE TO RELATED APPLICATION(S)

The present application is a continuation-application of International (PCT) Patent Application No. PCT/CN2019/109521 filed on Sep. 30, 2019, which claims foreign priority of Chinese Patent Application No. 201811393816.X, filed on Nov. 21, 2018, the contents of both of which are hereby incorporated by reference in their entireties.

TECHNICAL FIELD

The present application relates to the field of electronic devices, and in particular, to an electronic device and an assembly method thereof.

BACKGROUND

In order to improve screen-to-body ratios of electronic devices, regarding functional components in electronic devices, such as camera modules, a camera module is mounted by means of forming holes in a backlight module of an electronic device. However, in this method, a phenomenon that light leaks from the backlight module into the holes is prone to occur, thereby affecting photographing effect of the camera module.

SUMMARY

A first aspect of the present application provides an electronic device, comprising: a display module defining a first mounting hole, wherein a first light-shielding adhesive portion is formed in the first mounting hole; and a backlight module defining a second mounting hole; wherein the backlight module is attached to the display module, so that the first mounting hole is communicated with the second mounting hole to form a mounting space; a second light-shielding adhesive portion connected to the first light-shielding adhesive portion and the backlight module is formed in the second mounting hole.

A second aspect of the present application provides an electronic device, comprising: a display module defining a first mounting hole; a backlight module defining a second mounting hole, wherein the display module and the backlight module are attached together, and the first mounting hole is communicated with the second mounting hole to form a mounting space; a first light-shielding adhesive portion formed in the first mounting hole; and a second light-shielding adhesive portion formed in the mounting space and connected with the first light light-shielding adhesive portion.

A third aspect of the present application provides an assembly method of an electronic device, comprising: providing a display module defining a mounting hole and a backlight module defining a second mounting hole; forming a first light-shielding adhesive portion in the first mounting hole before assembling the display module and the backlight module together; assembling the display module and the backlight module together such that the first mounting hole is communicated with the second mounting hole to form a mounting space; and forming a second light-shielding adhesive portion in the mounting space after assembling the display module and the backlight module together.

BRIEF DESCRIPTION OF DRAWINGS

In order to describe technical solutions in embodiments of the present application more clearly, drawings required being used in description of the embodiments will be simply introduced below. Obviously, the drawings in the following description are merely some embodiments of the present application. For one of ordinary skill in the art, it is also possible to obtain other drawings according to these drawings without paying any creative work.

DETAILED DESCRIPTION

The application will be further described in detail below in accompany with the drawings and embodiments. It is particularly pointed out that the following embodiments are only used to illustrate the present application, but do not limit the scope of the present application. Similarly, the following embodiments are only some embodiments, but not all embodiment, of the present application. All other embodiments obtained by one of ordinary skill in the art without paying creative work should fall within the protection scope of the present application.

Mentioning "embodiment" herein means that a specific feature, structure, or characteristic described in accompany with an embodiment may be included in at least one embodiment of the present application. Appearances of the phrase in various places in the specification do not necessarily refer to the same embodiment, nor is it an independent or alternative embodiment mutually exclusive with other embodiments. Those skilled in the art can explicitly and implicitly understand that embodiments described herein can be combined with other embodiments.

In a first aspect of the present application, an embodiment provides an electronic device, comprising: a display module defining a first mounting hole, wherein a first light-shielding adhesive portion is formed in the first mounting hole; and a backlight module defining a second mounting hole; wherein the backlight module is attached to the display module, so that the first mounting hole is communicated with the second mounting hole to form a mounting space; a second light-shielding adhesive portion connected to the first light-shielding adhesive portion and the backlight module is formed in the second mounting hole.

In some embodiments, the backlight module comprises a back frame and an optical component, the back frame comprises a bottom wall and a circumferential wall, the optical component overlaps on the bottom wall, the second mounting hole runs through the bottom wall and the optical component, the circumferential wall is disposed in the second mounting hole and connected with the bottom wall, the circumferential wall is bent relative to the bottom wall.

In some embodiments, the display module comprises a panel component and a lower polarizer attached to the panel component, and the first mounting hole runs through the lower polarizer.

In some embodiments, the first light-shielding adhesive portion is connected to the hole wall of the first mounting hole in the lower polarizer and the panel component; the second light-shielding adhesive portion is connected to the first light-shielding adhesive portion and the circumferential wall.

In some embodiments, the first light-shielding adhesive portion comprises a first surface being opposite to the hole wall of the first mounting hole in the lower polarizer, and the second light-shielding adhesive portion comprises a second surface being opposite to the circumferential wall; the smallest distance between the first surface and an axis of the first mounting hole is equal to the smallest distance between the second surface and the axis of the first mounting hole.

In some embodiments, a light-shielding tape is provided between the backlight module and the display module, the light-shielding tape is connected to a side of the optical component being away from the bottom wall, an end of the circumferential wall being away from the bottom wall, and the lower polarizer.

In some embodiments, the light-shielding tape comprises an outer surface being away from the mounting space and an inner surface being opposite to the outer surface, the inner surface is flush with the circumferential wall; the second light-shielding adhesive portion is connected to the first light-shielding adhesive, the inner surface of the light-shielding tape, and the circumferential wall.

In some embodiments, the first light-shielding adhesive portion protrudes towards a direction being away from the panel component relative to the lower polarizer.

In some embodiments, the light-shielding tape and the first light-shielding adhesive portion define a groove, and a part of the second light-shielding adhesive portion is formed in the groove.

In some embodiments, the display module further comprises an upper polarizer, the upper polarizer is attached to a side of the panel component being away from the lower polarizer, the upper polarizer defines an aperture, and the aperture corresponds to the first mounting hole.

In some embodiments, the first mounting hole runs through the panel component.

In some embodiments, the display module further comprises an upper polarizer, the upper polarizer is attached to a side of the panel component being away from the lower polarizer, and the first mounting hole further runs through the upper polarizer.

In some embodiments, a hole wall of the first mounting hole in the panel component protrudes from a hole wall of the first mounting hole in the upper polarizer in a direction towards the mounting space.

In some embodiments, the first light-shielding adhesive portion is connected to the hole wall of the first mounting hole in the upper polarizer and the hole wall of the first mounting hole in the panel component; the second light-shielding adhesive portion is connected to the first light-shielding adhesive portion, the hole wall of the first mounting hole in the lower polarizer, and the circumferential wall.

In some embodiments, the panel component comprises an array substrate and a color film substrate arranged layer by layer, and the lower polarizer is attached to a side of the color film substrate being away from the array substrate.

In a second aspect of the present application, an embodiment provides an electronic device, comprising: a display module defining a first mounting hole; a backlight module defining a second mounting hole, wherein the display module and the backlight module are attached together, and the first mounting hole is communicated with the second mounting hole to form a mounting space; a first light-shielding adhesive portion formed in the first mounting hole; and a second light-shielding adhesive portion formed in the mounting space and connected with the first light light-shielding adhesive portion.

In some embodiments, the second light-shielding adhesive portion connects the first light-shielding adhesive portion to the backlight module.

In a third aspect of the present application, an embodiment provides an assembly method of an electronic device, comprising: providing a display module defining a mounting hole and a backlight module defining a second mounting hole; forming a first light-shielding adhesive portion in the first mounting hole before assembling the display module and the backlight module together; assembling the display module and the backlight module together such that the first mounting hole is communicated with the second mounting hole to form a mounting space; and forming a second light-shielding adhesive portion in the mounting space after assembling the display module and the backlight module together.

In some embodiments, the assembly method further comprises: connecting the first light-shielding adhesive portion to the backlight module using the second light-shielding adhesive portion.

In some embodiments, the assembly method further comprises: mounting a functional component in the mounting space.

Figure 1:
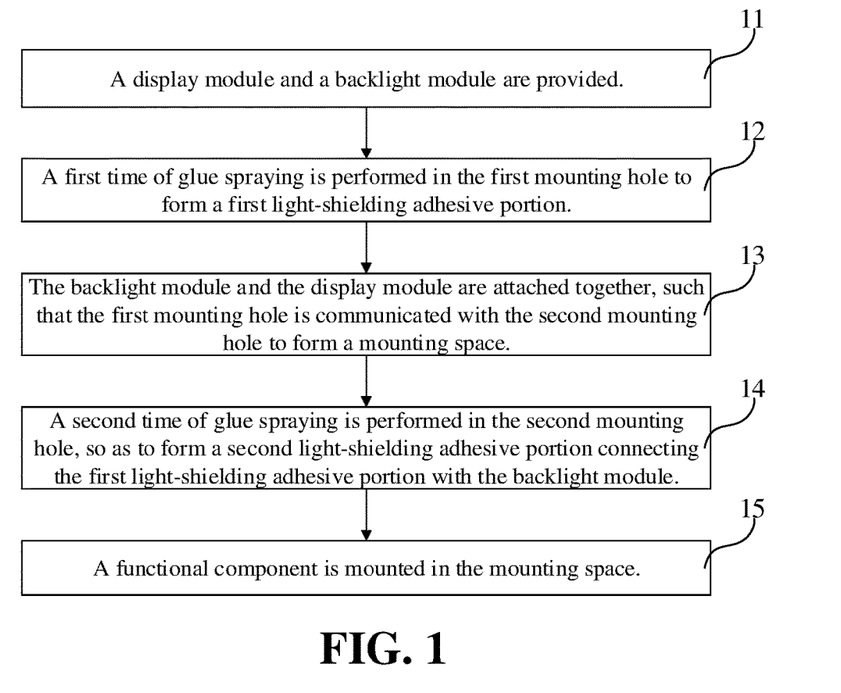
FIG. 1 is a structural flow chart of an embodiment of an assembly method of an electronic device provided by the present application.

Referring to FIG. 1, FIG. 1 is a flow chart of an embodiment of an assembly method for an electronic device provided by the present application. The electronic device in this embodiment can be any device with communication and storage functions, such as a tablet computer, a mobile phone, an electronic reader, a remote controller, a personal computer (PC), a notebook computer, a vehicular device, a network TV, a wearable device, or other smart devices with network functions. The assembly method for the electronic device in this embodiment may specifically include actions or operations at blocks 11 to 15:

At operation 11: A display module and a backlight module are provided.

Figure 2:
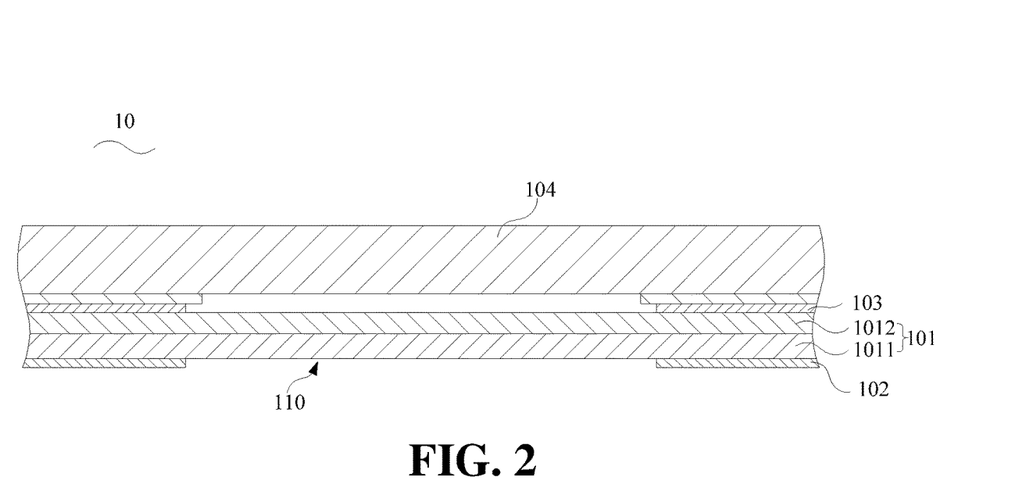
FIG. 2 is a structural schematic view of an embodiment of a display module in the step 11 of FIG. 1.
Figure 3:
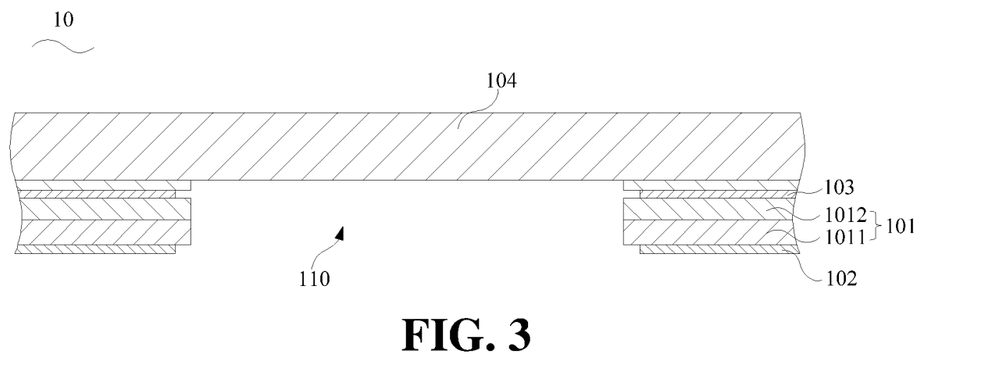
FIG. 3 is a structural schematic view of another embodiment of a display module in the step 11 of FIG. 1.

Also referring to FIG. 2 and FIG. 3, FIG. 2 is a structural schematic view of an embodiment of a display module 10 at the operation 11 of FIG. 1, and FIG. 3 is a structural schematic view of another embodiment of the display module 10 at the operation 11 of FIG. 1; wherein the display module 10 defines a first mounting hole 110.

Specifically, in one embodiment as shown in FIG. 2, the display module 10 comprises a panel component 101 and a lower polarizer 102 attached to the panel component 101; the panel component 101 comprises an array substrate 1011 and a color film substrate 1012 arranged layer by layer, the lower polarizer 102 is attached to a side of the color film substrate 1012 being away from the array substrate 1011, and the aforementioned first mounting hole 110 runs through the lower polarizer 102; in another embodiment as shown in FIG. 3, the aforementioned first mounting hole 110 runs through the panel component 101 and the lower polarizer 102.

Optionally, the display module further comprises an upper polarizer 103, the upper polarizer 103 is attached to a side of the panel component 101 being away from the lower polarizer 102; in another embodiment as shown in FIG. 3, the first mounting hole 110 further runs through the upper polarizer 103.

Optionally, in another embodiment as shown in FIG. 3, an end of the panel component 101 being close to the first mounting hole 110 protrudes from an end of the upper polarizer 103 being close to the first mounting hole 110 in a direction orienting the first mounting hole 110.

Optionally, the display module 10 in this embodiment further comprises a cover plate 104, the cover plate 104 is disposed at a side of the upper polarizer 103 being away from the panel component 101; in this embodiment, the cover plate 104 is adhered to the upper polarizer 103 through optical glue.

Figure 4:
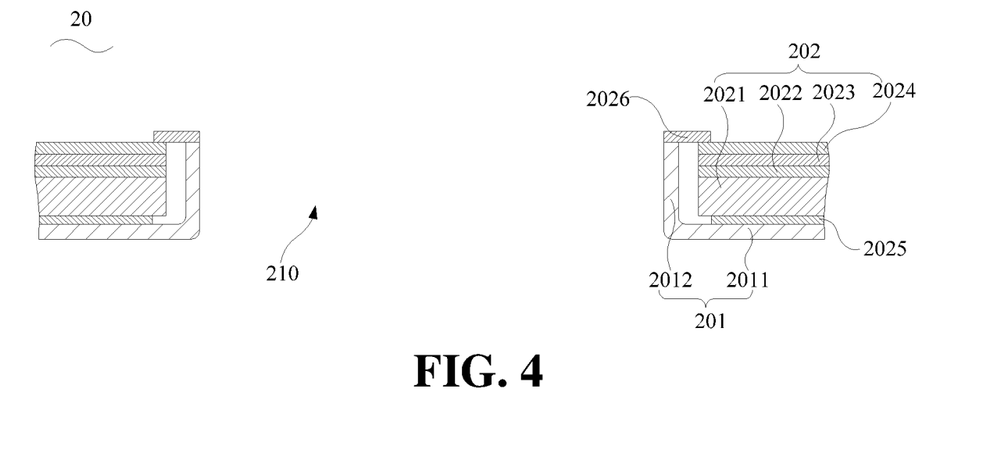
FIG. 4 is a structural schematic view of a backlight module in the step 11 of FIG. 1.

Referring to FIG. 4, FIG. 4 is a structural schematic view of a backlight module 20 in the step 11 of FIG. 1, wherein the backlight module 20 defines a second mounting hole 210.

Specifically, the backlight module 20 comprises a back frame 201 and an optical component 202, the back frame 201 comprises a bottom wall 2011 and a circumferential wall 2012, the optical component 202 and the bottom wall 2011 are arranged layer by layer, the second mounting hole 210 runs through the bottom wall 2011 and the optical component 202, the circumferential wall 2012 is disposed in the second mounting hole 210 and connected with the bottom wall 2011, and the circumferential wall is 2012 bent relative to the bottom wall 2011.

Optionally, the back frame 201 is a metal back frame.

Wherein, the optical component 202 comprises a light guide plate 2021 and a diffusion film 2022, a lower anti-reflection film 2023, and an upper anti-reflection film 2024 which are arranged layer by layer on a side of the light guide plate 2021 being away from the bottom wall 2011; the diffusion film 2022, the lower anti-reflection film 2023, and the upper anti-reflection film 2024 are sequentially arranged layer by layer in a direction being away from the light guide plate 2021.

Furthermore, a reflection sheet 2025 is provided between the light guide plate 2021 and the bottom wall 2011.

Further, a light-shielding tape 2026 is provided on a side of the upper anti-reflection film 2024 being away from the light guide plate 2021, and the light-shielding tape 2026 is adhered to the upper anti-reflection film 2024 and the circumferential wall 2012.

The terms "first" and "second" in the present application are only used for descriptive purposes, and should not be understood as indicating or implying relative importance or implicitly indicating the number of indicated technical features. Therefore, a feature defined with "first" and "second" may explicitly or implicitly include at least one such feature.

At operation 12: A first time of glue spraying is performed in the first mounting hole to form a first light-shielding adhesive portion.

Figure 5:
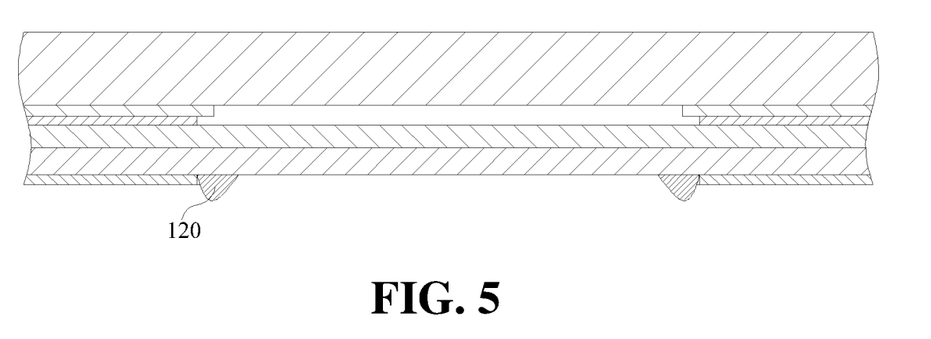
FIG. 5 is a structural schematic view of an embodiment of a display module in the step 12 of FIG. 1.

Also referring to FIG. 2 and FIG. 5, FIG. 5 is a structural schematic view of an embodiment of a display module in the step 12 of FIG. 1. In this embodiment, when the first mounting hole 110 only runs through the lower polarizer 102, a first time of glue spraying is performed at a junction formed by a side of the panel component 101 being close to the lower polarizer 102 and an end of the lower polarizer 102 being close to the first mounting hole 110 so as to form the first light-shielding adhesive portion 120, thereby preventing a leakage phenomenon from the junction into the first mounting hole 110 from occurring. In a process of a specific embodiment, it is possible to form an adhesive ring at the aforesaid position by a method of rotatably glue spraying, so as to serve as the first light-shielding adhesive portion 120.

Figure 6:
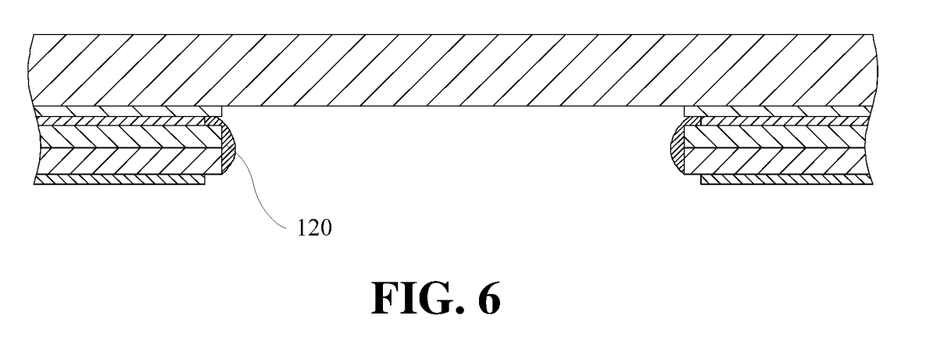
FIG. 6 is a structural schematic view of another embodiment of a display module in the step 12 of FIG. 1.

Also referring to FIG. 3 and FIG. 6, FIG. 6 is a structural schematic view of another embodiment of a display module in the step 12 of FIG. 1. In another embodiment, when the first mounting hole 110 runs through the panel component 101 and the lower polarizer 102, a first time of glue spraying is performed at an end of the panel component 101 orienting the first mounting hole 110 to form the first light-shielding adhesive portion 120.

Optionally, in another embodiment, it is further possible to perform a first time of glue spraying at both ends of the panel component 101 and the upper polarizer 103 being close to the first mounting hole 110 to form the first light-shielding adhesive portion 120, and it is also possible to perform a first time of glue spraying at ends of the panel component 101, the lower polarizer 102, and the upper polarizer 103 being close to the first mounting hole 110 to form the first light-shielding adhesive portion 120.

Optionally, in another embodiment, when an end of the panel component 101 being close to the first mounting hole 110 protrudes from an end of the upper polarizer 103 being close to the first mounting hole 110 in a direction orienting the first mounting hole 110, it is possible to perform a first time of glue spraying at the end of the panel component 101 being close to the first mounting hole 110 and a portion of the panel component 101 protruding from the upper polarizer 103 to form the first light-shielding adhesive portion 120; at the same time of shielding light, an adhesion area between the first light-shielding adhesion portion 120 and the panel component 101 can be increased, thereby preventing the first light-shielding adhesion portion 120 from falling down from the panel component 101.

Optionally, the first light-shielding adhesive portion 120 can be hot melt adhesive or ultraviolet curing adhesive. Hot melt adhesive is a kind of plastic adhesive of which a physical state changes with a change of a temperature within a certain temperature range, while its chemical properties remain unchanged. Compared with general glue, hot melt adhesive has greater bonding strength and better curing effect; and it is easier to control a thickness of glue, which can better meet design requirements of narrow frames of electronic device; in addition, hot melt adhesive is thermoplastic polyurethane, products bonded with hot melt adhesive are easier to disassemble or repair. For example, the hot melt adhesive may be PUR hot melt adhesive, that is, moisture curing reactive polyurethane hot melt adhesive, is main component is isocyanate-terminated polyurethane prepolymer. Adhesiveness and toughness (elasticity) of PUR hot melt adhesive can be adjusted, and it has excellent bonding strength, temperature resistance, chemical resistance and aging resistance. UV curing adhesive is a kind of adhesive cured by ultraviolet light radiation, it can be used as a bonding material. For example, the first light-shielding adhesive 120 uses black UV curing adhesive, the black UV curing adhesive can meet the requirements of light-shielding and shading, and has characteristics of strong adhesive force, fast curing, thin glue, etc. By using the black UV curing adhesive, at the same time of shielding light, liquid and water vapor can be prevented from entering the inside of the display module 10.

At operation 13: The backlight module and the display module are attached together, such that the first mounting hole is communicated with the second mounting hole to form a mounting space.

Figure 7:
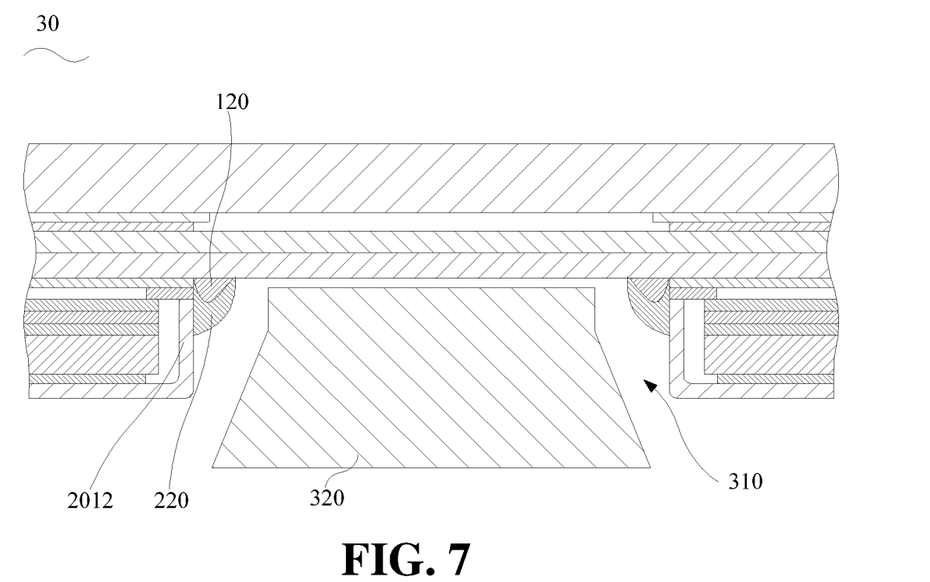
FIG. 7 is a structural schematic view of an embodiment of an electronic device provided by the present application.
Figure 8:
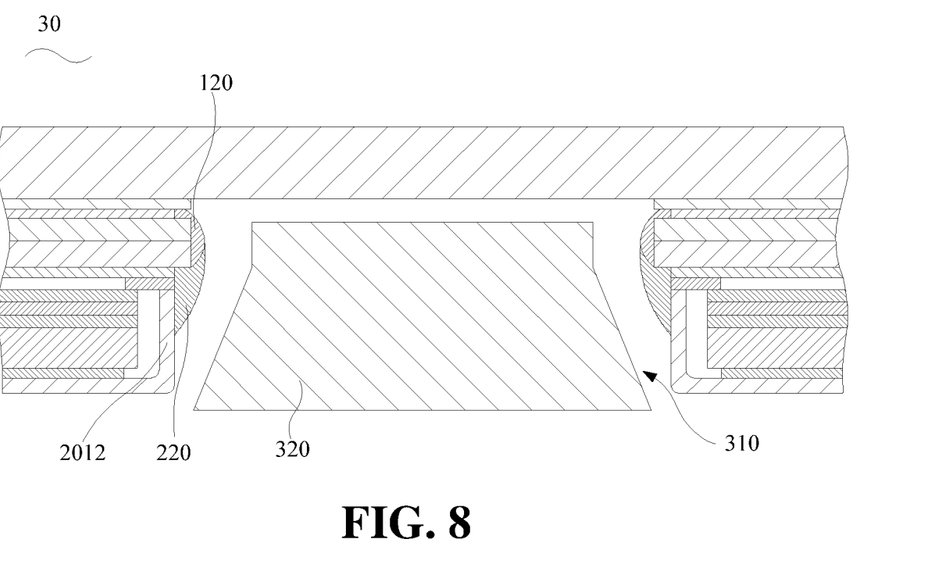
FIG. 8 is a structural schematic view of another embodiment of an electronic device provided by the present application.

Also referring to FIG. 7 and FIG. 8, FIG. 7 is a structural schematic view of an embodiment of an electronic device 30 provided by the present application, and FIG. 8 is a structural schematic view of another embodiment of an electronic device 30 provided by the present application; wherein, a side of the optical component 202 in the backlight module 20 being away from the bottom wall 2011 is attached to the lower polarizer 102 in the display module 10, such that the first mounting hoe 110 and the second mounting hole 210 form a mounting space 310.

At operation 14: A second time of glue spraying is performed in the second mounting hole, so as to form a second light-shielding adhesive portion connecting the first light-shielding adhesive portion with the backlight module.

Specifically, a second time of glue spraying is performed on the first light-shielding adhesive portion 120 and the circumferential wall 2012, so as to form a second light-shielding adhesive portion 220 connecting the first light-shielding adhesive portion 120 with the circumferential wall 2012. Thus, both the first light-shielding adhesive portion 120 and the second light-shielding adhesive portion 220 shield light in the mounting space 210, thereby preventing a leakage phenomenon from the backlight module 20 into the mounting hole 310 from occurring. Furthermore, compared with a method of spraying glue only once, spraying glue twice can avoid the case that spraying glue only once results in an insufficient glue spraying width, which causes ineffective light shielding; moreover, if glue spraying is performed only once, in order to achieve better light shielding effect, glue spraying area is inevitably increased, thereby causing that the case of sputtering to other areas are prone to occur during a glue spraying process.

Optionally, the assembly method in this embodiment can further comprise:

At operation 15: A functional component is mounted in the mounting space.

Optionally, the functional component 320 can be a camera module.

Further referring to FIG. 7 and FIG. 8, the present application further provides an electronic device 30, the electronic device 30 is assembled by the method in the aforementioned embodiments, and can specifically refer to relating description in the aforementioned embodiments, they are not repeated here.

In the assembly method for the electronic device provided by embodiments of the present application, the first time of glue spraying is performed in the first mounting hole in the display module to form the first light-shielding adhesive portion; the backlight module is attached to the display module to form the mounting space, and then the second time of glue spraying is performed in the second mounting hole, so as to form the second light-shielding adhesive portion connecting the first light-shielding adhesive portion with the backlight module. Thus, both the first light-shielding adhesive portion and the second light-shielding adhesive portion shield light in the mounting space, thereby preventing a leakage phenomenon from the backlight module into the mounting space from occurring. Moreover, compared with a method of spraying glue only once, spraying glue twice can avoid the case that spraying glue only once results in an insufficient glue spraying width, which causes ineffective light shielding.

The above descriptions are only some embodiments of the present application, and are not intended to limit the protection scope of the present application. Any equivalent device or equivalent process transformation made using the content of the specification and drawings of the present application, or directly or indirectly application in other related technical fields, is equally included in the patent protection scope of the present application.

What is claimed is:

1. An electronic device, comprising:
   a display module defining a first mounting hole, wherein a first light-shielding adhesive portion is formed in the first mounting hole; and
   a backlight module defining a second mounting hole; wherein the backlight module is attached to the display module, so that the first mounting hole is communicated with the second mounting hole to form a mounting space; a second light-shielding adhesive portion connected to the first light-shielding adhesive portion and the backlight module is formed in the second mounting hole.

2. The electronic device according to claim 1, wherein the backlight module comprises a back frame and an optical component, the back frame comprises a bottom wall and a circumferential wall, the optical component overlaps on the bottom wall, the second mounting hole runs through the bottom wall and the optical component, the circumferential wall is disposed in the second mounting hole and connected with the bottom wall, the circumferential wall is bent relative to the bottom wall.

3. The electronic device according to claim 2, wherein the display module comprises a panel component and a lower polarizer attached to the panel component, and the first mounting hole runs through the lower polarizer.

4. The electronic device according to claim 3, wherein the first light-shielding adhesive portion is connected to the hole wall of the first mounting hole in the lower polarizer and the panel component; the second light-shielding adhesive portion is connected to the first light-shielding adhesive portion and the circumferential wall.

5. The electronic device according to claim 3, wherein the first light-shielding adhesive portion comprises a first surface being opposite to the hole wall of the first mounting hole in the lower polarizer, and the second light-shielding adhesive portion comprises a second surface being opposite to the circumferential wall; the smallest distance between the first surface and an axis of the first mounting hole is equal to the smallest distance between the second surface and the axis of the first mounting hole.

6. The electronic device according to claim 3, wherein a light-shielding tape is provided between the backlight module and the display module, the light-shielding tape is connected to a side of the optical component being away from the bottom wall, an end of the circumferential wall being away from the bottom wall, and the lower polarizer.

7. The electronic device according to claim 6, wherein the light-shielding tape comprises an outer surface being away from the mounting space and an inner surface being opposite to the outer surface, the inner surface is flush with the circumferential wall; the second light-shielding adhesive portion is connected to the first light-shielding adhesive, the inner surface of the light-shielding tape, and the circumferential wall.

8. The electronic device according to claim 6, wherein the first light-shielding adhesive portion protrudes towards a direction being away from the panel component relative to the lower polarizer.

9. The electronic device according to claim 8, wherein the light-shielding tape and the first light-shielding adhesive portion define a groove, and a part of the second light-shielding adhesive portion is formed in the groove.

10. The electronic device according to claim 3, wherein the display module further comprises an upper polarizer, the upper polarizer is attached to a side of the panel component being away from the lower polarizer, the upper polarizer defines an aperture, and the aperture corresponds to the first mounting hole.

11. The electronic device according to claim 3, wherein the first mounting hole runs through the panel component.

12. The electronic device according to claim 11, wherein the display module further comprises an upper polarizer, the upper polarizer is attached to a side of the panel component being away from the lower polarizer, and the first mounting hole further runs through the upper polarizer.

13. The electronic device according to claim 12, wherein a hole wall of the first mounting hole in the panel component protrudes from a hole wall of the first mounting hole in the upper polarizer in a direction towards the mounting space.

14. The electronic device according to claim 13, wherein the first light-shielding adhesive portion is connected to the hole wall of the first mounting hole in the upper polarizer and the hole wall of the first mounting hole in the panel component; the second light-shielding adhesive portion is connected to the first light-shielding adhesive portion, the hole wall of the first mounting hole in the lower polarizer, and the circumferential wall.

15. The electronic device according to claim 3, wherein the panel component comprises an array substrate and a color film substrate arranged layer by layer, and the lower polarizer is attached to a side of the color film substrate being away from the array substrate.

16. An electronic device, comprising:
a display module defining a first mounting hole;
a backlight module defining a second mounting hole, wherein the display module and the backlight module are attached together, and the first mounting hole is communicated with the second mounting hole to form a mounting space;
a first light-shielding adhesive portion formed in the first mounting hole; and
a second light-shielding adhesive portion formed in the mounting space and connected with the first light-shielding adhesive portion.

17. The electronic device according to claim 16, wherein the second light-shielding adhesive portion connects the first light-shielding adhesive portion to the backlight module.

18. An assembly method of an electronic device, comprising:
providing a display module defining a first mounting hole and a backlight module defining a second mounting hole;
forming a first light-shielding adhesive portion in the first mounting hole before assembling the display module and the backlight module together;
assembling the display module and the backlight module together such that the first mounting hole is communicated with the second mounting hole to form a mounting space; and
forming a second light-shielding adhesive portion in the mounting space after assembling the display module and the backlight module together.

19. The assembly method according to claim 18, further comprising:
connecting the first light-shielding adhesive portion to the backlight module using the second light-shielding adhesive portion.

20. The assembly method according to claim 18, further comprising:
mounting a functional component in the mounting space.

* * * * *